United States Patent [19]

Mandekic

[11] Patent Number: 4,598,749
[45] Date of Patent: Jul. 8, 1986

[54] VEHICLE TIRE WITH TRACTION MEANS

[76] Inventor: Anthony V. Mandekic, 5694 Lone Pine Cyn. Rd., Wrightwood, Calif. 92397

[21] Appl. No.: 691,318

[22] Filed: Jan. 14, 1985

[51] Int. Cl.⁴ .............. B60C 27/12; B60C 5/20; B60C 11/18
[52] U.S. Cl. .................. 152/210; 137/351; 137/561 A; 141/325; 152/217; 152/222; 152/337.1; 156/95; 156/96
[58] Field of Search .............. 152/210, 208, 209 R, 152/221, 222, 338, 337, 334, 333, 330 R, 209 D, 450, 331.1, 333.1, 334.1, 337.1, 338.1, 217, 218; 156/95, 96; 141/325, 287, 312; 137/351, 561 A

[56] References Cited

U.S. PATENT DOCUMENTS

| | | | |
|---|---|---|---|
| 3,043,356 | 7/1962 | Mayhercy | 152/208 |
| 3,078,901 | 2/1963 | Iaquinta | 152/210 |
| 3,340,921 | 9/1967 | Garfinkle | 152/208 |
| 3,942,572 | 3/1976 | Crandall | 152/208 |

*Primary Examiner*—Edward Kimlin
*Assistant Examiner*—Thomas Bokan
*Attorney, Agent, or Firm*—Henderson & Sturm

[57] ABSTRACT

A vehicle tire with traction-improving devices, wherein the basic tire has a plurality of uniformly spaced apart cross grooves running essentially from sidewall to sidewall. Each groove is fitted with an inflatable bag or bladder which, when uninflated, retracts within the circle of the road-engaging surface of the tread. An annular manifold is affixed to at least one sidewall and is connected by conduits to the cross members. This manifold has a valved air inlet which may be used to pressurize the cross members via the manifold and thus to project the inflated members radially beyond the circle of the tread so that they engage the road surface. Depressurizing the manifold of course causes the members to retract. Each cross member is equipped with some form of traction-improving substance, structure or the like to enhance road grippability, especially in slippery road conditions. Features include separable coupling of the cross members to the manifold, provision of the cross members and manifold as a separate attachment for certain existing tires, etc.

3 Claims, 9 Drawing Figures

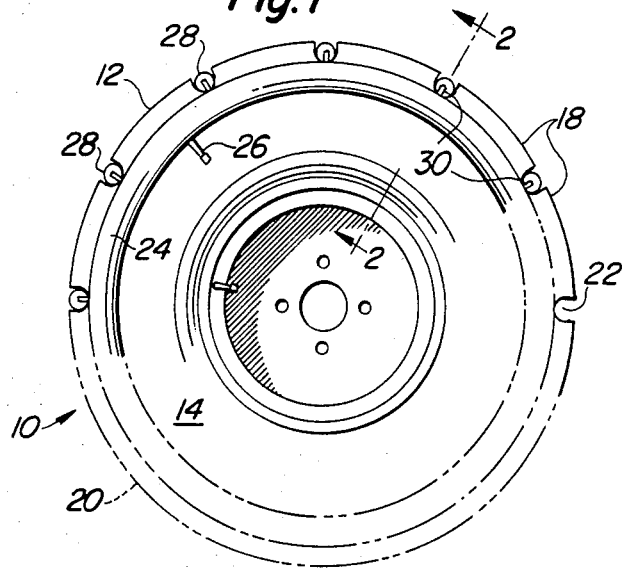
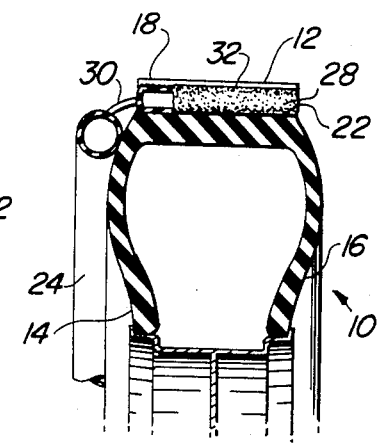
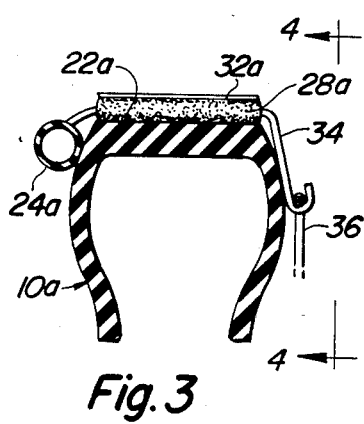
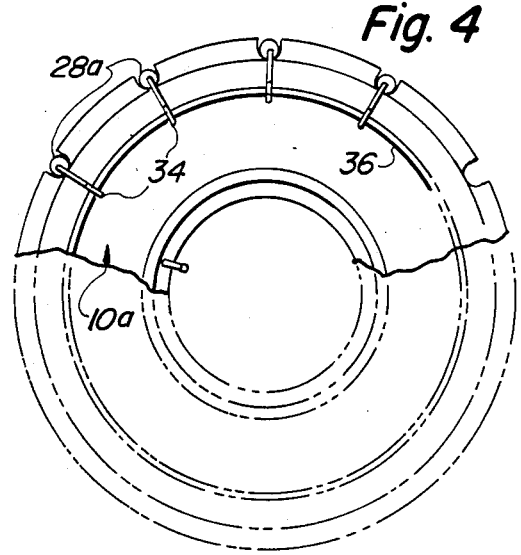
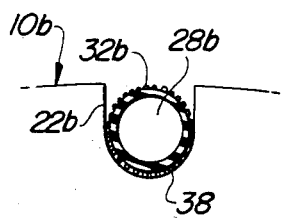
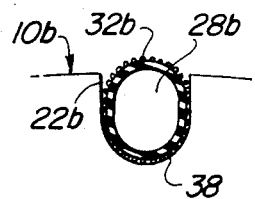

VEHICLE TIRE WITH TRACTION MEANS

BACKGROUND AND SUMMARY OF THE INVENTION

The basic aim of the present invention is to provide a simple form of anti-skid mechanism that is normally in place on the tire in retracted condition and which can be easily projected radially to provide an improved gripping surface. Prior art resides mainly in vehicle tires with extendible and retractable studs operating on the principle of two air chambers within the tire, as exemplified mainly by the U.S. Pat. to Garfinkle No. 3340921. Structures of this type are limited to the provision of traction-increasing studs principally at the center or median plane of the tire and do not have the lateral dimension necessary to provide traction in deep snow, mud, etc.

The present invention provides a tire having a body consisting of a tread and a pair of opposed sidewalls. A substantial portion of the circumference of the tread is typically patterned for normal driving conditions. In addition, the tread is interrupted by a plurality of uniformly circumferentially spaced apart cross grooves of substantial depth, running from one sidewall to the other and opening radially outwardly. Elongated inflatable means are carried in at least some (preferably all) of the grooves and are retracted below the tread surface when not inflated. These means or cross members are inflatable via an annular manifold affixed to one side of the tire, projecting the members beyond the normal tread and thus into position to deal with adverse conditions, such as ice, snow, mud, etc. Inflation may be easily effected by any suitable means, primarily most conveniently by the use of the so-called emergency inflation can currently available at service stations, auto supply stores, etc. Preferably, typical tire valves are used so as to increase the versatility of the invention.

Features and advantages other than those noted in the foregoing will become apparent as preferred embodiments of the invention are disclosed in detail in what follows.

BRIEF DESCRIPTION OF THE DRAWINGS

FIG. 1 is an elevation, partly in phantom, of one form of the improved tire.

FIG. 2 is an enlarged cross section as seen on the line 2—2 of FIG. 1.

FIG. 3 is a view similar to FIG. 2 but showing a modified form.

FIG. 4 is a reduced-scale elevation as seen along the line 4—4 on FIG. 3.

FIG. 5 is an enlarged cross-section through one of the grooves, showing its inflatable cross member and associated resilient retracting means.

FIG. 6 is a view like FIG. 5 but showing the cross member inflated and extended or projected.

DESCRIPTION OF PREFERRED EMBODIMENTS OF THE INVENTION

Figure 7:
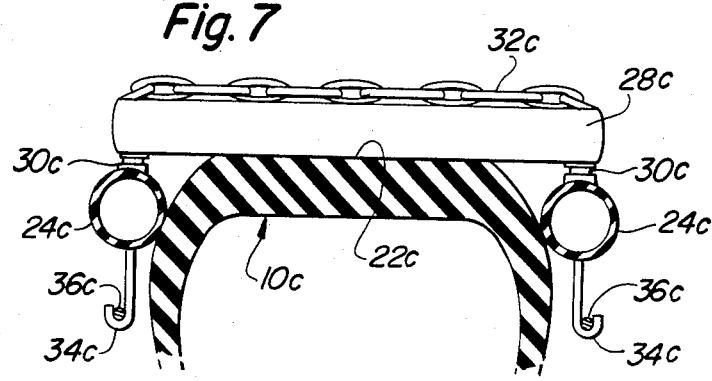
FIG. 7 is a view like FIG. 2 but showing another form of the invention.

FIGS. 1 and 2 show a tire (10) of generally conventional configuration having a tread (12) and a pair of opposite sidewalls (14) and (16). The tread is made up of a plurality of arcuate tread portions (18) lying on a common cylinder (20) and forming the normal tread of the tire for use in typical clear-road conditions. This tread is interrupted by a plurality of uniformly circumferentially spaced apart cross grooves (22) that open radially outwardly. Affixed in any suitable manner, as by vulcanizing, etc., to the outer or "curb" sidewall (14) is an annular manifold (24), hollow in nature and preferably formed of sturdy elastomer or elastomer-fabric material capable of withstanding high speed rotation of the tire as well as engagement with curbs, deep ruts and the like. This manifold is fitted with a conventional air inlet-outlet valve (26) to which may be applied any form of air-pressure supply, such as available at auto service stations, tire pumps, pressurized "emergency" cans and the like. Each cross groove is fitted with a cross member in the form of an elongated inflatable bag (28) which runs from one sidewall to the other and which, when not inflated, lies within or below the tread circle 20. Each bag is conduit-connected at (30) to the manifold (24) so that when the manifold is pressurized, the bags likewise are inflated and their radialmost outer portions are caused to project outwardly beyond the tread circle, thus themselves becoming parts of the tread for use during adverse road conditions. In this form of the invention, the inner parts of the bags are adhered to the bottoms of the grooves and the material of which the bags are constructed is such that the uninflated bags cannot project as a result of centrifugal force. Each bag may have its outer surface provided with traction-increasing means (32), such as abrasive particles, beads and other materials known to the snow tire industry. It will thus be seen that a simple, ready-to-use traction device has been provided, one that may be easily inflated and deflated as conditions require, avoiding the cumbersome task of installing and removing typical add-on traction devices such as the conventional skid chains, etc.

In the modified form of the invention shown in FIGS. 3 and 4, a tire body (10a) has a tread configuration like that described above and has cross grooves (22a) fitted with inflatable cross members (28a) fed by a pressurizible and depressurizible annular manifold (24a), all according to FIGS. 1 and 2, with one difference being that the inflatable cross members (28a) have secured thereto at the inside or "brake" side of the tire suitable hooks (34) which cooperate with an annular cinch element (36). This may be an elastic band of the general nature conventionally employed to tighten ordinary skid chains, or it may be of any other nature suitable to the occasion. The cross members are equipped with abrasive means (32a). It will be recognized that the components of the two forms of the invention described so far may be selectively interchanged to arrive at the best product in the circumstances. Because of the cinch (36), the cross members need not be adhered to the bottoms of the grooves in the tread.

In the FIGS. 5-6 modification, just enough of a tire (10b) is shown as a background for a modified arrangement of cross grooves (22b) and inflatable cross members (28b), these being connected to a manifold (not shown) as before. In this case, the traction-improving means takes the form of one or more steel chains (32b) on the cross members (28b). In addition, each set of chains is associated with resilient or biasing means in the form of springs (38) which fit within the grooves (22b) and which function, when the cross members are deflated, to keep the cross members and chains retracted within the tread circle (FIG. 5). The springs yield to inflation of the cross members to enable the chains to be projected beyond the tread circle to function as traction means (FIG. 6). Here again the attributes of the previously described forms of the invention may be imported into the FIGS. 5-6 from and vice versa, this being clear from the description without further elaboration.

The modified tire (10c) shown in FIG. 7 has a tread as before but the traction device has a pair of annular manifolds (24c), one along each sidewall of the tire. Cross members (28c) are connected to the manifolds and fit into cross grooves (22c) in the tire tread as explained previously herein and the manifolds and cross members are retained on the tire by a system of hooks (34c) on the manifolds and a pair of annular-bands or cinches (36c) engaging the hooks in the manner earlier set forth. A significant difference is that in this case the air conduits (30c) are in the form of separable couplers of any suitable type so as to enable detachment and replacement of the cross members in the event of damage or extreme wear. Chains or the like, as at (32c), form the traction-increasing means.

Figure 8:
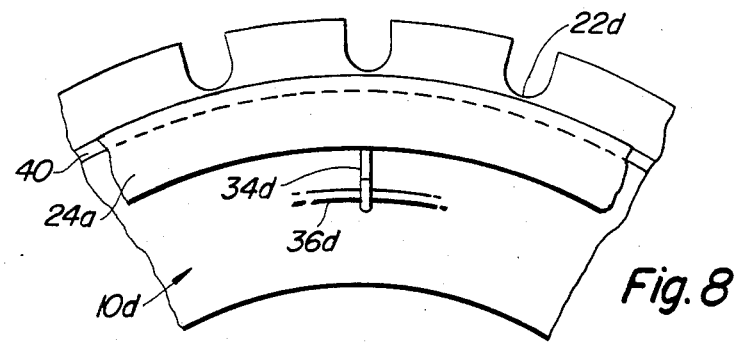
FIG. 8 is a fragmentary elevation of the tire of FIG. 7.
Figure 9:
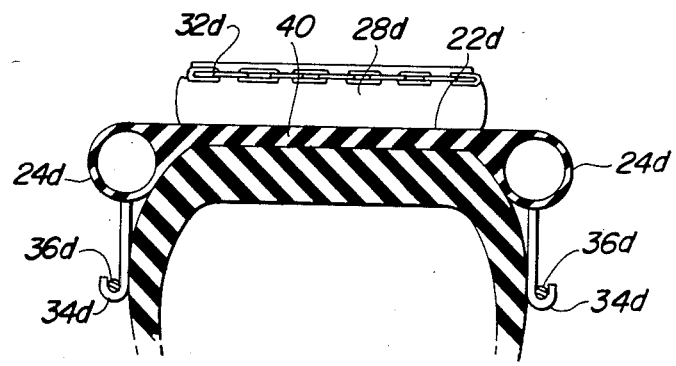
FIG. 9 is a cross section of the tire shown in FIG. 7.

The traction improvement forming the subject matter of FIGS. 8 and 9 deals with an arrangement in which a tire body (10d) does not itself have cross grooves like those at 22, for example. In this case an annular band in the form of a "recap" (40) is secured about the tread of the tire, as by vulcanizing for example, and this has the cross grooves (22d) in which inflatable cross members (28d) are fitted to be fed by oppositely disposed annular manifolds (24d), one at each side of the tire. The manifolds may be vulcanized to the "recap" or the whole, including the "recap" may be an attachment, in which case the "recap" is not adhered to the tire but to only the manifolds and the manifolds are equipped with a hook and cinch system (34d-36d) at each side of the tire, as explained in connection with FIGS. 3 and 4. Means (32d) provides traction increasing means. Again, parts may be interchanged with or imported from structure to structure to obtain the best embodiment in the circumstances.

In all forms of the invention, the improved traction means features the laterally (of the tire) elongated inflatable and deflatable cross members, which provide traction throughout the whole width of the tire, as distinguished from a localized means centered on the median plane of the tire. Also featured is the ability of the cross members to lie retracted during normal road conditions, adding little if any noise to the tire when running. Ready projection of the cross members is available via many sources, the most convenient of which is the well-known emergency pressure can which may be easily carried in the vehicle for ready use.

Features other than those specifically enumerated will become apparent to those versed in the art, as will many changes in the preferred embodiments disclosed, all of which may be achieved without departure from the spirit and scope of the invention.

I claim:

1. A vehicle tire having a tread and opposite sidewalls, said tread having an annular road-engaging surface interrupted by a purality of uniformly circumferentially spaced apart, radially outwardly opening cross grooves extending from sidewall to sidewall, a traction-improving device comprising a pluraltiy of fluid-inflatable and -deflatable cross members, one receivable in each groove to extend end-to-end thereof and so dimensioned as to lie in retracted position below the road-engaging surface when deflated and to project beyond said surface when inflated, an annular fluid-inflatable and -deflatable manifold having means for the concentric affixation thereof to one end of the sidewalls, said manifold having a fluid inlet and outlet valve disposed radially inwardly of the manifold and accessible at said one sidewall for the selective pressurizing and depressurizing said manifold, and a plurality of fluid conduit means connected in parallel fluid flow relationship between the manifold and the cross members.

2. The tire of claim 1, including means at the ends of the cross members opposite to the manifold for additionally attaching the cross members to the tire.

3. The tire of claim 1, including a plurality of separable conduit couplers detachably connecting the cross members to the manifold.

* * * * *